United States Patent
Gunda et al.

(10) Patent No.: US 7,890,555 B2
(45) Date of Patent: Feb. 15, 2011

(54) FILE SYSTEM MOUNTING IN A CLUSTERED FILE SYSTEM

(75) Inventors: Kalyan C. Gunda, Wappingers Falls, NY (US); Brian D. Herr, Rhinebeck, NY (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/775,381

(22) Filed: Jul. 10, 2007

(65) Prior Publication Data

US 2009/0019098 A1 Jan. 15, 2009

(51) Int. Cl.
G06F 12/00 (2006.01)
G06F 17/30 (2006.01)
(52) U.S. Cl. .................. 707/822; 709/220; 709/223
(58) Field of Classification Search .............. None
See application file for complete search history.

(56) References Cited

U.S. PATENT DOCUMENTS

| | | | |
|---|---|---|---|
| 5,828,876 A | 10/1998 | Fish et al. | |
| 5,893,086 A | 4/1999 | Schmuck et al. | |
| 5,940,838 A | 8/1999 | Schmuck et al. | |
| 5,950,199 A | 9/1999 | Schmuck et al. | |
| 5,963,963 A | 10/1999 | Schmuck et al. | |
| 5,974,424 A | 10/1999 | Schmuck et al. | |
| 5,987,477 A | 11/1999 | Schmuck et al. | |
| 5,999,712 A * | 12/1999 | Moiin et al. | 709/220 |
| 5,999,976 A | 12/1999 | Schmuck et al. | |
| 6,021,508 A | 2/2000 | Schmuck et al. | |
| 6,023,706 A | 2/2000 | Schmuck et al. | |
| 6,032,216 A | 2/2000 | Schmuck et al. | |
| 6,279,032 B1 * | 8/2001 | Short et al. | 709/209 |
| 6,615,256 B1 * | 9/2003 | van Ingen et al. | 709/220 |
| 6,701,332 B1 * | 3/2004 | Vella | 1/1 |
| 6,954,881 B1 | 10/2005 | Flynn Jr. et al. | |

(Continued)

OTHER PUBLICATIONS

Implementation of a Disaster Resilient Linux Cluster with Storage Subsystem Based Data Replication, by Werner Fischer, Jun. 2004, Computer- and Mediensicherheit in Hagenberg.*

(Continued)

*Primary Examiner*—Jay A Morrison
(74) *Attorney, Agent, or Firm*—Jon A. Gibbons; Fleit Gibbons Gutman Bongini & Bianco PL

(57) ABSTRACT

A method effectively preventing a requesting node from unfencing and mounting a file system subsequent to a failure in a cluster file system having a plurality of active nodes. The method comprising first upgrading one active node in the cluster to function as a cluster manager node. The cluster manager is in communication with all nodes. The cluster manager is assigned manager responsibilities, in part, comprising first receiving an active status request from the node requesting to mount a file system. The cluster manager first queries the quorum nodes to determine whether each node considers the cluster manager to still have cluster management responsibilities for the file system. If a majority of quorum nodes consider the cluster manager to still have cluster management responsibilities for the file system then the cluster manager responds to the requesting node's active status request. Thereafter, the requesting node proceeds with mounting the file system.

19 Claims, 2 Drawing Sheets

U.S. PATENT DOCUMENTS

| | | | |
|---|---|---|---|
| 7,120,650 B2 | 10/2006 | Loy et al. | |
| 7,209,551 B1 * | 4/2007 | Schroeder et al. | 379/88.13 |
| 7,216,135 B2 | 5/2007 | Sawdon et al. | |
| 7,363,346 B2 * | 4/2008 | Groner et al. | 709/214 |
| 2002/0078312 A1 | 6/2002 | Wang-Knop et al. | |
| 2002/0091814 A1 * | 7/2002 | Arendt et al. | 709/223 |
| 2006/0074940 A1 * | 4/2006 | Craft et al. | 707/100 |

OTHER PUBLICATIONS

Re: [Announce] Minneapolis Cluster Summit, Jul. 29-30, linux-kernel message board, David Teigland, Date: Thu Jul. 8, 2004.*

Mohinda, et al., "Distributed Token Management in Calypso File System," Sixth IEEE Symposium on Parallel and Distributed Processing, 1994, Dallas, Texas, Oct. 1994, pp. 290-297, XP010100174 ISBN: 978-0-8186-6427-4.

Schmuck, et al., "GPFS: A Shared-Disk File System for Large Computing Clusters," Proceedings of Fast. Conference on File and Storage Technologies, Jan. 28, 2002, pp. 231-244, XP009042083.

International Search Report dated Jan. 19, 2009 for PCT/EP2008/058189.

* cited by examiner

FILE SYSTEM MOUNTING IN A CLUSTERED FILE SYSTEM

FIELD OF THE INVENTION

The present invention relates generally to distributed file systems and, more particularly, to systems and methods which quickly and efficiently prevent a node in a clustered file system from unfencing itself and mounting a file system subsequent to a communication failure.

BACKGROUND OF THE INVENTION

Advances in communication technology have allowed numbers of machines to be aggregated into computing clusters of effectively unbounded processing power and storage capacity that can be used to solve much larger problems than could a single machine. Because clusters are composed of independent and effectively redundant computers, they have a potential for fault-tolerance. This makes them suitable for other classes of problems in which reliability is paramount. As a result, there has been a great interest in clustering technology in the past several years.

Cluster file systems found in the arts include IBM's General Parallel File System (GPFS). GPFS is a parallel, shared-disk file system for cluster computers available on the RS/6000 SP parallel supercomputer and on Linux clusters that provides, as closely as possible the behavior of a general-purpose POSIX file system running on a single machine.

One drawback of clusters is that programs must be partitioned to run on multiple machines. It can be difficult for these partitioned programs to cooperate or share resources. Perhaps one of the most important resource is the file system. In the absence of a cluster file system, individual components of a partitioned program share cluster storage in an ad-hoc manner. This can complicate programming, limit performance, and compromise reliability.

Some cluster file systems allow client nodes direct access to metadata, such as directories and file attributes stored on data servers alongside the file data (distributed metadata), and use a distributed locking protocol to synchronize updates to these metadata. Other systems, such as SAN-FS, Lustre and P-NFS, use one or more dedicated metadata server nodes to handle metadata. The advantage of a cluster file system over a traditional file server is that by distributing data over many data servers, higher aggregate data throughput can be provided.

Traditional supercomputing applications, when run on a cluster, require parallel access from multiple nodes within a file shared across the cluster. Other applications, including scalable file and web servers and large digital libraries, are often characterized by interfile parallel access. In the latter class of applications, data in individual files is not necessarily accessed in parallel. But since the files reside in common directories and allocate space on the same disks, file system data structures (metadata) are still accessed in parallel. In large computing systems, even administrative actions such as adding or removing disks from a file system or rebalancing files across disks, can involve a great amount of work.

The disks of a clustered file system may be spread across some or all of the nodes that make up the cluster.

Many disk drive systems rely on standardized buses, such as the Small Computer System Interface (SCSI) bus to connect the host computer to the controller and to connect the controller and the disk drives. SCSI is a communications protocol standard that has become increasingly popular for interconnecting computers and other I/O devices. To do so, SCSI is layered logically. This layering allows software interfaces to remain relatively unchanged while accommodating new physical interconnect schemes based upon serial interconnects such as Fibre Chanel and Serial Storage Architecture (SSA). The first version of SCSI (SCSI-1) is described in ANSI X3.131-1986. The SCSI standard has undergone many revisions as drive speeds and capacities have increased. The SCSI-3 specification is designed to further improve functionality and accommodate high-speed serial transmission interfaces.

When a node failure is detected, one cannot be sure if the node is physically down or if the communication network has failed making it look as if the node were down when in fact the node may very well still be active. Consequently file system log recovery must be delayed long enough to make sure that the failed node will not be able to do any I/O after this point in time until the state of the failed node can be ascertained with certainty. As the systems grow in complexity, it is increasingly less desirable to have interrupting failures at either the disk drive or at the controller level. As a result, systems have become more reliable. Nevertheless, it is more than an inconvenience to the user should the disk drive system go down or off-line; even though the problem is corrected relatively quickly.

High availability cluster multiprocessing may use SCSI's Reserve/Release commands to control access to disk storage devices when operating in non-concurrent mode. Shared non-concurrent access to logical volumes through multiple paths using SCSI-3 Persistent Reserve commands is described in U.S. Pat. No. 6,954,881, which is incorporated herein by reference. High availability cluster multiprocessing provides a way to failover access to disk storage devices to another node because of hardware or software failures.

Persistent Reserve is a technique which refers to a set of SCSI-3 standard commands and command options which provide SCSI initiators with the ability to establish, preempt, query, and reset a reservation policy with a specified target device. The functionality provided by the Persistent Reserve commands is a superset of the Reserve/Release commands. Persistent Reserve is insufficient to provide the data integrity and rapid recovery that is often required in large file systems.

What is needed is a method which quickly and efficiently prevents a node from unfencing itself and mounting a file system subsequent to a communication failure.

SUMMARY OF THE INVENTION

What is provided is a novel method which prevents a node from unfencing itself and mounting a file system subsequent to a failure. A cluster manager node is elected to manage disk I/Os for a cluster of nodes. Before an active node in the cluster mounts a file system, the node must first send a Remote Procedure Call (RPC) to the cluster manager node requesting verification that the cluster manager still views the requesting node as an active node within the cluster. The requesting node waits before taking action until it receives the appropriate token from the cluster manager. After the cluster manager receives the RPC from the requesting node but before it responds with the appropriate token, the cluster manager sends a RPC to the quorum nodes. The cluster manager is requesting verification that the quorum nodes still consider the cluster manager as the manager node for that particular file system. All quorum nodes will respond appropriately. If, based on received responses from the quorum nodes queried, it is determined that they understand the cluster manager to be the current cluster manager node for that file system, then the cluster manager replies to the requesting node's active status verification RPC. Once a requesting node receives from the cluster manager a response that the cluster manger considers the requesting node to be an active node (not a failed node) then the requesting node unfences itself and mounts the file system. On the other hand, if the cluster manager does not receive replies from the quorum nodes then the cluster manager assumes that it has somehow either lost communication with the quorum nodes or that its responsibilities as cluster manager have been downgraded for some reason. In which case, the cluster manager replies that it is not the cluster manager node, and the requesting node will retry the RPC to a new elected cluster manager (if one can be elected). The cluster manager node goes into a predetermined state waiting for recovery efforts to commence/conclude, or otherwise indicates that a failure has occurred. In such a manner, a node which is believed to have failed through either a software or hardware failure, is quickly and efficiently prevented from mounting a file system and thus corrupting data subsequent to that failure.

The invention will next be described in connection with certain illustrated embodiments. It should be understood that various changes and modifications can be made by those skilled in the art without departing from the spirit or scope of the invention.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
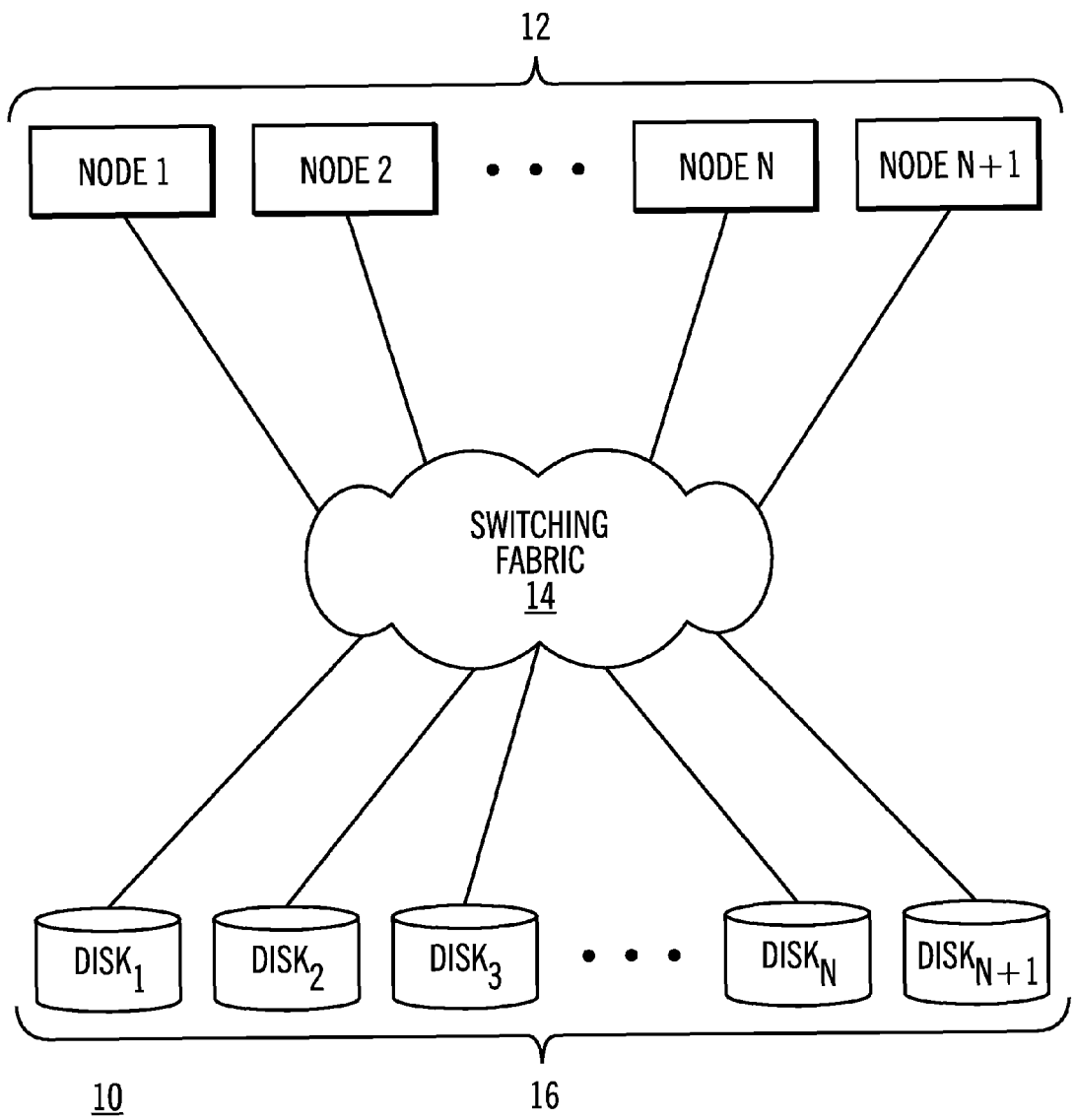
FIG. 1 illustrates the shared disk architecture of a clustered file system upon which the novel features of the present invention will find their intended uses.

What is provided is a method which establishes a novel protocol for ensuring that a failed node in a clustered file system of active nodes does not mount a file system subsequent to a failure which places that node out of communication with one or more nodes in the cluster. The failed node is quickly and efficiently prevented from unfencing itself and mounting a file system.

One skilled in this art would be readily familiar with the concepts inherent in parallel file systems and those associated with parallelism in the file/data sharing context. In addition, one would be skilled in the art of computer programming as it relates to nodes, tokens, locking, and the like, in a clustered file system environment.

For purposes hereof, a machine readable medium is an article of manufacture such as a floppy disk, a high capacity read-only memory, an optically readable compact disc or CDROM or DVD, a tape, a transmission type media such as a digital or analog communications link, or the like commonly found in the arts.

In order to better understand the description of the embodiments of the invention described, a brief outline of some terms used herein is provided.

A file is a named data object comprising a string of bits which can be accessed by a computer application. A file has certain attributes, such as length, modification time, and time of last access, to name a few.

Metadata is defined as control structures created by the file system software to describe the structure of a file and the use of the disks which contain the file system. Specific types of metadata which apply to file systems of this type include: inode, directories, allocation maps, and logs. An inode contains the attributes of the file plus a series of pointers to areas of disk which contain the data which makes up this file. An inode may be supplemented by indirect blocks which supplement the inode with additional pointers if the file is large. A directory is a control structure which associates a name with a set of data represented by an inode. Allocation maps are control structures which indicate whether specific areas of the disk or other control structures, such as inodes, are in use or available. This allows software to effectively assign available blocks and inodes to new files. Logs represent records used to keep the other types of metadata in sync in the case of failures. It contains single records which describe related updates to multiple structures.

A file structure is the organization of data objects on a disk. In addition to the file data itself, the file structure typically also contains metadata: a directory that maps filenames to the corresponding files, file metadata that contains information about the file, and the location of the file data on disk (i.e., which disk blocks hold the file data). This includes an allocation map that records which disk blocks are currently in use to store metadata and file data, and a superblock that contains overall information about the file structure (e.g., the locations of the directory, allocation map, and other metadata structures).

A file system is a computer program that allows other application programs to store and retrieve data on media such as disk drives. A software component manages a defined set of disks providing access to data in ways prescribed by the set of Xopen and POSIX standards related to file data. The term file system also describes the set of data and metadata contained within a specific set of disks. For brevity, the sequential discussion herein will use the term disk, but the concepts apply to any similar block structured storage media. The file system allows application programs to create files and give them names, to store (or write) data into them, to read data from them, to delete them, and perform other operations on them.

A shared disk file system is one in which a file structure residing on one or more disks is accessed by multiple file systems running on separate computers. All of the computers are peers in that any may perform any role required to manage the data. Specific roles as nodes may be assigned to specific computers as needed. A shared disk attachment is a method of attaching disks to multiple computers with a protocol that makes the disks appear to be locally attached to each file system. The exact attachment protocol to each computer is not important but includes various forms of network attached disks, switched disk attachment, or store and forward attachment. The key items are that it appears local to the file system and appears the same to all instances of the file system.

A cluster of nodes, on which the file system and the applications that use it run, connect to the disks or disk subsystems over a switching fabric wherein the nodes in the cluster have access to all disks. File system code manages reads and writes requested by applications. This management uses the application requests and metadata to create access data within the file system. This function is the bulk of the processing and is often identical on all computers in the cluster.

Cluster file systems generally consist of a set of client nodes, data servers, and one or more metadata servers. Client nodes access data stored on data servers through a block storage protocol (e.g., SCSI), object storage protocol (e.g., T10 OSD), or file access protocol (e.g. P-NFS), over a SAN or other communication network (e.g., Ethernet or InfiniBand). Generally, the cluster system assumes a conventional block I/O interface with no particular intelligence at the disks. It is assumed herein that the computers (or nodes) have no shared memory even though they could and in many likely implementations would have a local memory and at least some shared memory, and that they are connected to the disks on which the file structure resides by some means such as a bus or a switching network or some other communication network. It is assumed that the nodes communicate with each other by similar means.

In a cluster file system, large files are typically divided into equal sized blocks and consecutive blocks are usually placed on different disks in a round-robin fashion. To minimize seek overhead, the block size is large. Large blocks allow a large amount of data to be retrieved in a single I/O from each disk. Small files and the end of large files can be stored in smaller units called sub-blocks which can be as small as $1/32$ of the size of a full block or smaller.

Attention is directed to FIG. 1 which illustrates the shared disk architecture 10 of a clustered file system upon which this invention will find its intended uses. The clustered file system of FIG. 1 generally consists of a cluster of computers (nodes), collectively at 12, on which applications run. These nodes are in communication with a plurality of disks or disk subsystems, collectively at 16, over a switching fabric 14. All nodes in the cluster typically have equal access to all disks.

Files are typically striped across all disks in the file system. Striping of data across multiple disks is a technique to store successive data blocks (e.g., of a file) on distinct disks. In striping, the file system writes successive blocks of a file to distinct disks according to some cyclic permutation of the disk numbers $0, \ldots, N-1$. Striping achieves the full throughput of which the disk subsystem is capable in addition to balancing the load on the disks.

The switching fabric that connects file system nodes to disks may consist of a storage area network (SAN), (e.g., fiber channel or iSCSI). Alternatively, individual disks may be attached to some number of I/O server nodes that allow access from file system nodes through a software layer running over a general-purpose communication network.

To exploit disk parallelism when reading a large file from a single-threaded application, data is often prefetched into a buffer pool. Prefetching is a technique common in this art which is used in a file system to reduce I/O latency. This is achieved by reading blocks of sequentially accessed files in advance of when the data is requested by an application. I/O requests are issued in parallel to as many disks as necessary to achieve the bandwidth of which the switching fabric is capable. Similarly, dirty data buffers that are no longer being accessed are written to disk in parallel. This approach allows reading or writing data from/to a single file at the aggregate data rate supported by the underlying disk subsystem and switching fabric.

The shared disk implementation of FIG. 1 provides the shortest available path for moving the data from the disk to/from the using application. There is no file system server in the path for either data or metadata. Any available path can be used avoiding a bottleneck or single point of failure.

In order to better understand the invention, a general description of pertinent aspects of a parallel file system is provided herein. It should be understood that this is provided to give the unfamiliar reader a basic understanding of this subject matter to which the invention pertains. One skilled in this art would appreciate the simplicity while recognizing that a more thorough understanding of this subject matter requires a more comprehensive study. A series of patents to Schmuck et al. describe various aspects of a shared parallel disk file system, including: U.S. Pat. Nos. 5,893,086; 5,940,838; 5,950,199 5,963,963; 5,974,424, 5,987,477; 5,999,976; 6,021,508; 6,023,706; 6,032,216, 7,120,650, 6,954,881, and 7,216,135, each of which is incorporated herein by reference in their entirety.

File systems generally comprise a plurality of directories with individual filename entries. For a file to be retrieved or created, a filename must be either found in the directory if it exists or added to the directory block if it does not exist. Large file systems can have very large directories containing millions of individual files each having their own filename. In order to support efficient filename lookup in very large directories, extensible hashing is often used to organize a plurality of directory entries within a directory. Extensible hashing is an advance over the standard hashing techniques which require that the maximum number of hash buckets be know from the start. Extensible hashing solves this problem by using a variable number of bits from the value of the hash function.

For directories that occupy more than one disk block, the block containing the directory entry for a particular name can be found by applying a hash function to the filename and using the n low-order bits of the hash value as the block number, where n depends on the size of the directory. As a directory grows, extensible hashing adds new directory blocks one at a time. When a create operation finds no more room in the directory block designated by the hash value of the new filename, it splits the block in two. When a hash bucket is split, a new hash bucket is added and some of the records are moved from the existing hash bucket into the new one. Which records are moved is determined by re-evaluating the hash function and using one more bit to determine the hash bucket number: records where the additional bit is zero stay in the existing bucket, those with a one value for the additional bit are moved to the new bucket. The logical block number of the new directory block is derived from the old block number by adding a '1' in the n+1 bit position, and directory entries with a '1' in the n+1 bit of their hash value are moved to the new block. Other directory blocks remain unchanged.

In a file system, data written to a regular file is often stored in one or more disk blocks on disk. Unix and Unix-like file system interfaces allow writing new data past the current end of a file. This allows creating files with gaps or "holes", i.e., areas within a file to which no data was ever written. Such files are often referred to as sparse files. File system implementations that support sparse files efficiently allocate disk storage only for the areas of a file to which data was written but not for holes or at least not for holes that are larger than the block size or the unit of disk allocation used by the file system.

A large directory based on extensible hashing can be represented as a sparse file with holes in the file representing directory blocks that have not yet been split. By checking for sparse regions in the directory file, it can be determined how often a directory block has been split and thus how many bits of the hash value to use in order to locate the directory block containing a given filename. A lookup operation requires only a single directory block access regardless of the size and structure of the directory file. Read operations on sparse files return zeros where the read offset and length intersect a hole.

A hash tree can be represented as a sparse file on disk. Records are relocated when a hash bucket is split. Each hash bucket is stored in the file at an offset given as i*s, where i is the hash bucket number (starting with zero) and s is the hash bucket size. The directory starts out as an empty file. When the first record is inserted, it is stored in hash bucket zero which is subsequently written to the file, increasing the file size from zero to s. When hash bucket zero needs to be split, bucket one is written increasing the file size from s to 2*s. The next hash bucket split will write hash bucket number two or number three, depending on which of the first two buckets needs to be split next. If bucket one is split next, hash bucket number three will be written, increasing the file size from 2*s to 4*s, leaving the file with a hole at offset 2*s, where hash bucket number two would go. Given the file size, the depth of the longest hash tree branch, (in a hash tree with maximum depth d all hash bucket numbers are d-bits or less and at least one hash bucket must have a bucket number where the $d^{th}$ bit is one), the maximum depth d can be computed as the number of bits in the largest hash bucket number, f/s−1, where f is the file size. To lookup a record with a given key, the hash bucket number b is computed given by the depth d least significant bits of the hash value for the given key. If all branches of the hash tree had the same depth, we would be assured of finding the record in the hash bucket given by that key. Since the branch that stores the given key may have depth less than d, bucket b might not yet exist in the hash tree. If this is the case, the file will have a hole at the offset bus. Therefore, if a hole is found, a new hash bucket number b' can be computed by using one fewer bit of the hash value. This will yield the location of the record if the hash tree branch had depth d−1. This procedure is repeated as long as it encounters a hole in the file. Once a non-hole is found, the record with the given key must be in that hash bucket, if it exists.

Although the extensible hashing implementation described works with any hash bucket size, it will be more efficient if the bucket size is the same as the file system block size or a multiple of the block size. This is because an efficient implementation of sparse files does not require any disk I/O to read a hole if the hole is aligned on file system block boundaries. Hence, all lookups require at most one disk I/O to read the actual hash bucket that would hold the record if that hash bucket is not currently cached. Note that this assumes that the file metadata that contains the location of the file's disk blocks is cached.

An allocation map is also part of the file structure and is typically stored on disk as part of the file structure residing in one or more disk blocks. An allocation map records the allocation status (free or in-use) of all disk blocks in the file system. The map is preferably divided into a large fixed number n of separately lockable regions. Each region containing the allocation status of $1/n^{th}$ of the disk blocks on every disk in the file system. This map layout allows allocated disk space to be properly striped across all disks by accessing only a single allocation region at a time. The total number of regions is preferably determined at file system creation time based on the expected number of nodes in the cluster.

If the nodes comprising a shared disk file system do not properly synchronize their access to the shared disks, they may corrupt the file structure. This applies in particular to the allocation map. To illustrate this, consider the process of allocating a free block. Suppose two nodes simultaneously attempt to allocate a block. In the process of doing this, they could both read the same allocation map block, both find the same element A(i,j) describing free block (i,j), both update A(i,j) to show block (i,j) as allocated, both write the block back to disk, and both proceed to use block (i,j) for different purposes, thus violating the integrity of the file structure. A more subtle but just as serious a problem occurs even if the nodes simultaneously allocate different blocks X and Y, if A(X) and A(Y) are both contained in the same map block. In this case, the first node sets A(X) to allocated, the second node sets A(Y) to allocated, and both simultaneously write their buffered copies of the map block to disk. Depending on which write is done first, either block X or Y will appear free in the map on disk. If, for example, the second node's write is executed after the first node's write, block X will be free in the map on disk. The first node will proceed to use block X (e.g., to store a data block of a file), but at some later time, another node could allocate block X for some other purpose, again with the result of violating the integrity of the file structure.

Allocating disk spaces requires updates to the allocation map which must be synchronized between nodes. While the allocation map organization greatly reduces interference among nodes writing files at the same time, some interference is possible. This is due to the fact that, when switching regions, a node has no information on which to base its choice of region to switch to. Ideally, it should switch to a region not presently in use by another node and one that has sufficient free blocks to allow it to continue writing without further region switches. An allocation manager is utilized to provide a means to enable a node to make an informed choice of regions.

For each file system, one of the nodes in the cluster is responsible for maintaining free space statistics about all allocation regions. This allocation manager node initializes free space statistics by reading the allocation map when the file system is mounted. The statistics are kept loosely up-to-date via periodic messages in which each node reports the net amount of disk space allocated or freed during the last period. Instead of all nodes individually searching for regions that still contain free space, nodes ask the allocation manager for a region to try whenever a node runs out of disk space in the region it is currently using. To the extent possible, the allocation manager prevents lock conflicts between nodes by directing different nodes to different regions.

The above localizes allocation map accesses for file creation. But since deleting a file also updates the allocation map, it is possible for file deletion to cause frequent region switches and therefore interfere with nodes that are simultaneously writing files. Even if the blocks in individual files are localized to a single region, it is still frequently the case that a node will delete a number of files (e.g., the contents of a directory) that were created by different nodes or at different times and were therefore allocated from different regions. A file created by a parallel program running on several hundred nodes might have allocated blocks in several hundred regions. Deleting the file requires locking and updating each of these regions, perhaps taking them from the nodes currently allocating out of them, which could adversely impact performance. Therefore, instead of processing all allocation map updates at the node on which the file was deleted, those that update regions known to be in use by other nodes are sent to those nodes for execution. The allocation manager periodically distributes hints about which regions are in use by which nodes to facilitate shipping deallocation requests.

To avoid corrupting the file structure, a node must obtain a token for each bit map block before reading it into memory. If the node modifies the block (i.e., by allocating or freeing a block), it must write the block to disk before releasing the token. A token allows a node to cache data it has read from disk because the data cannot be modified elsewhere without the token having been revoked.

A plurality of token management subsystems are often utilized to grant tokens to nodes. A lock manager handles different recovery paradigms needed for shared disk file systems and also adds additional lock states required to allow parallel update of the same file. Since the required central functions in the lock manager have no attachment to a specific computer, they can be migrated from computer to computer to satisfy performances and availability needs.

The overhead of obtaining tokens from a token manager subsystem, and of writing map blocks back to disk before releasing a token held on the block, can substantially degrade the performance of a shared disk file system. The token manager keeps track of all lock tokens granted to all nodes in the cluster. Acquiring, relinquishing, upgrading, or downgrading a token requires a message to the token manager. Locking only the portion of the file that is required immediately is expensive and would require calls to a token lock manager with every application call. It is important to try to minimize the number of token management calls.

To allocate successive blocks of a striped file, a node obtains a token for a region and allocates successive blocks according to the striping permutation using free blocks in the region (i.e., blocks whose allocation map elements indicate their state is free). Before releasing the token, the node writes the region back to disk. If, when trying to allocate a block on that disk, the node switches regions: it writes the region back to disk and releases the token then obtains a token for another region and attempts to allocate from it. If the node unsuccessfully tries all regions in an attempt to find a free block on a particular disk, it can then either (depending on the file system's striping policy) allocate a block on another disk or return an out-of-space condition to the application. In the former case, when all disks have been unsuccessfully tried, the file system returns an out-of-space condition. As a performance enhancement, the file system would typically allow other nodes to steal the token for its region between file block writes. In response to a token steal request, the node writes the region to disk and relinquishes the token.

To deallocate a block, the file system reads in the region containing the allocation map describing the block, updates its state to free, and writes the region back to disk before releasing the token.

The cost of disk I/O caused by token conflicts dominates the cost of token manager messages. One of most likely reason for a high load on the token manager node is lock conflicts that cause token revocation. When a node downgrades or relinquishes a token, dirty data or metadata covered by that token must be flushed to disk and/or discarded from the cache. Therefore, a much more effective way to reduce token manger load and improve overall performance is to avoid lock conflicts in the first place.

The token protocol can be optimized to further reduce the cost of token management and improve response time. When it is necessary to revoke a token, it is the responsibility of the revoking node to send revoke messages to all nodes that are holding the token in a conflicting mode, to collect replies from these nodes, and to forward these as a single message to the token manager. In such a manner, acquiring a token will rarely require more than two messages to the token manager regardless of how many nodes may be holding the token in a conflicting mode.

A cluster file system allows scaling I/O throughput beyond what a single node can achieve. Preserving file system consistency and POSIX semantics requires synchronizing access to data and metadata from multiple nodes. Synchronization can be achieved by distributed locking. Distributed locking allows greater parallelism than centralized management as long as different nodes operate on different pieces of data/metadata.

A distributed lock manager uses a centralized global lock manager running on one of the nodes in the cluster in conjunction with local lock managers in each file system node. The global lock manager coordinates locks between local lock managers by handing out lock tokens which convey the right to grant distributed locks without the need for a separate message exchange each time a lock is acquired or released.

Repeated accesses to the same disk object from the same node only require a single message to obtain the right to acquire a lock on the object (the lock token). Once a node has obtained the token from the token manager or 'token server' or 'lock manager', subsequent operations issued on the same node can acquire a lock on the same object without requiring additional messages. Only when an operation on another node requires a conflicting lock on the same object are additional messages necessary to revoke the lock token from the first node so it can be granted to the other node. Lock tokens also play a role in maintaining cache consistency between nodes. When lock conflicts are frequent, the overhead for distributed locking may exceed the cost of forwarding requests to a central node. In which case, data or metadata that is frequently accessed and updated from different nodes can be better managed by a more centralized approach wherein all conflicting operations are forwarded to a designated node which performs the request read or update operations.

Getting a lock usually requires that a token will be acquired first and this is considered an expensive operation. It would be beneficial to cache tokens at a node by anticipating the access patterns of the file. On the other hand, acquiring a token that is not needed might reduce performance since this token would be needed by another node. Serializing accesses to different regions in a file to which processes on different nodes write in parallel is done by distributed byte range locks.

Byte-range locking is used to synchronize reads and write to file data. This allows parallel applications to write concurrently to different parts of the same file, while maintaining POSIX read/write atomicity semantics. Applications that do not require POSIX semantics can utilized data shipping to bypass byte-range locking and avoid token state issues. However, acquiring a token for a byte range for the duration of the read/write call and releasing it afterwards can increase locking overhead.

When a process needs to lock a byte range, it first needs to acquire an appropriate byte range token. A byte range token request is examined for a specified byte range by comparing the request with the existing conflicting ranges in the entire multi-node system and granting the largest possible byte range which does not require a token revoke from another computer. This reduces the probability that the next operation on the requesting node would require another token request.

The byte range token represents the node's access rights to a portion of a file. Thus, if a node holds a byte range token for file X for range (100,200) in read mode, it means that the node may safely read that portion of the file. However, to prevent stealing the token, the node must lock the token before the actual read, since if another node needs to write the same portion, it might steal the token. Locking the token prevents the steal. After the read has completed, the token can be safely unlocked.

Byte range tokens are typically negotiated as follows. Information about write offsets is communicated during token negotiation by specifying a required range, which corresponds to the offset and length of the write system call currently being processed, and a desired range, which includes likely future accesses. For sequential access, the desired range will be from the current write offset to infinity. The token protocol will revoke byte ranges only from nodes that conflict with the required range. The token server will then grant as a large a sub-range of the desired range as is possible without conflicting with ranges still held by other nodes.

The first node to write to a file will acquire a byte-range token for the whole file (zero to infinity). As long as no other nodes access the same file, all read and write operations are processed locally without further interactions between nodes. When a second node begins writing to the same file, it will need to revoke at least part of the byte-range token held by the first node. When the first node receives the revoke request, it checks whether the file is still in use. If the file has since been closed, the first node will give up the whole token and the second node will then be able to acquire a token covering the whole file. Thus, in the absence of concurrent write sharing, byte-range locking behaves just like whole-file locking. It is efficient because a single token exchange is sufficient to access the whole file.

If the second node starts writing to a file before the first node closes the file, the first node will relinquish only part of its byte-range token. If the first node is writing sequentially at offset $0_1$ and the second node at offset $0_2$ the first node will relinquish its token from $0_2$ to infinity (if $0_2 > 0_1$) or from zero to $0_1$ (if $0_2 < 0_1$). This will allow both nodes to continue writing forward from their current write offsets without further token conflicts. In general, when multiple nodes are writing sequentially to non-overlapping sections of the same file, each node will be able to acquire the necessary token with a single token exchange as part of its first write operation.

When trying to lock a byte range, the token manger is first queried to determine if a compatible token exists on the node. The range that is probed is the minimum range that is required by the operation. If the token is available locally, it is locked and no further token activity takes place. However, if the token is not available, then a token is requested. The required range is computed based on the offset and length of the file operation. The desired range is based on the access pattern of the file. If the file is accessed randomly then the desired range will be equal to the required range since there is probably no advantage in stealing tokens from other nodes. If, however, the file is accessed sequentially, the desired range starts from the required range's start, but ends at infinity (there's a special value to represent infinity). This is an attempt to minimize future token requests since the need for future locks can be predicted (by hints).

When a node holds a token that conflicts with a request for a token on another node, it gets a revoke request. The request contains the requesting node's required and desired ranges. Here, the node has to make a decision what range it can relinquish. If the required range is equal to the desired range, the decision is easy and the granted range is the required (and desired) range. However, if the desired range is different than the required range, that means that the requesting node is accessing the file sequentially, and it wishes to have a token that starts at the required range's start but ends at infinity.

The node then makes a pass over all its active processes that access the file, and checks whether they access the file sequentially or randomly. If all of them access the file randomly, then the node grants the desired range. However, if one or more of the processes access the file sequentially, it would be a waste to relinquish the desired range since with high probability, we know what token will be requested soon. In this case, the file pointers (i.e., the anticipated location of the next operation) of all the sequential operations are examined, and the minimum offset is calculated. It is anticipated that these operations will not access file regions which are below this minimum since they are sequential. The granted range is stretched to that calculated minimum if it is higher than the required range. Allowing caching of tokens with regard to the file access pattern saves acquisition of tokens which is a costly operation and thus improves the overall performance of the system.

A metanode manages file metadata for parallel read and write in the shared-disk environment. Although nodes may read and write to different areas of the file if they present an appropriate lock on the sections when they are reading or writing, they all need to access the same metadata. By regulating access to the metadata, the metanode synchronizes read/write operations so that a consistent view of the file will be available from all nodes.

A single node is appointed for each file which is responsible for accessing and updating the file's metadata. The metanode for a particular file is elected dynamically with the help of the token manager or token server. The metanode is responsible for handling the I/O activity of the metadata from and to the disk (or disks) on which the metadata reside. All the other nodes communicate with the metanode in order to fetch or update metadata information. These nodes do not access the metadata information on the disk directly. Nodes access the metanode for metadata. The metanode prevents a considerable amount of disk activity.

When a node first accesses a file, it tries to acquire the metanode token for the file node (from the metanode token server). The token is granted to the first node to do so. Other nodes instead learn the identity of the metanode. Thus, in traditional workloads without concurrent file sharing, each node becomes metanode for the files it uses and handles all metadata updates locally. When a file is no longer being accessed on the metanode and ages out of the cache on that node, the node relinquishes its metanode token and stops acting as metanode. When it subsequently receives a metadata request from another node, it sends a negative reply. The other node will then attempt to take over as metanode by acquiring the metanode token. The metanode for a file tends to stay within the set of nodes actively accessing the file.

The metanode keeps a cached copy of the metadata which reflects the metadata on disk. Other nodes also keep a cached copy of the metadata which they read in the past from the metanode, and which they augmented as needed. Each metadata element has its own pattern of usage and special characteristics.

The metanode keeps the information about the file's metadata and acts as a smart cache between the disk and all the nodes that access the file. There are situations when the metanode ceases to serve this function. In order to enable smooth operation and recovery, these situations need to be handled. Nodes that used to access the metanode need to elect a new metanode in a straight forward way. The election process takes into account the access patterns of the file. In one embodiment, there is only one metanode per file.

For each file, a metanode token is defined. There are typically three modes for the metanode token: "ro" (read-only), "ww", (weak-write) and "xw" (exclusive-write). The rules are: "xw" token conflicts with all modes. "ww" conflicts with "xw" and itself. "ro" conflicts with "xw" only. Thus, there are two possibilities: either 0 or more nodes hold the token in "ro" and then at most one node can hold the token in "ww". Or, a single node holds the token in "xw". When the node opens a file for the first time, it tries to acquire the metanode token in mode "ww". The token manager grants the token in "ww" if no other node holds the token in "ww" or "xw". If this happens, the node becomes the metanode manager. However, if another node holds the token in "ww", then the token manager grants the token in "ro". Then, the node knows that another node is the metanode. It can query the token manager to find out who the metanode for this file is.

There are situations when a node must become a metanode. In this case, asking for a "ww" token will not help since the old metanode will not downgrade its token. Here the node that wishes to become the metanode asks for an "xw" token. This will cause a revoke message to be sent to the existing metanode. The old metanode will then downgrade its token "ro" and the token manager will return a "ww" token to the new metanode. If a node asks for an "xw" token and no other nodes hold this token at all then the token manager will grant the token in that mode. If a node holds the token in "xw", then it is the metanode for this file, but in addition, no other node has this file open. In this case, if a node tries to acquire the token in "ww", a revoke message is sent to the metanode. As a result, a node downgrades its "xw" token to "ww", and the token manager is thus able to grant a "ro" token to the new node.

Every node can ask for a named token with a specific mode. The token manager grants the token to the node if the mode does not conflict with tokens with the same name which were granted to other nodes. For each token there is a list of the possible modes and a conflict table. If the requested token conflicts with a token which was granted to another node, a revoke is done, and the conflicting node downgrades its token mode to a mode which does not conflict with a requested mode. The token manager grants the token to the node if the mode does not conflict with tokens with the same name which were granted to other nodes.

In a large file system, it is not feasible to run a file system check (fsck) to verify/restore file system consistency each time the file system is mounted or every time that one of the nodes in a cluster goes down. Instead, all metadata updates that affect file system consistency are recorded in a journal or write-ahead log.

Each node has a separate log for each file system it mounts. The log is stored in that file system. Because this log can be read by all other nodes, any node can perform recovery on behalf of a failed node. It is not necessary to wait for the failed node to come back to life. After a failure of a node, file system consistency can be restored quickly by simply re-applying all updates recorded in the failed node's log. For example, creating a new file requires updating a directory block as well as the inode of the new file. After acquiring locks on the directory block and the inode, both are updated in the buffer cache, and log records are spooled that describe both updates. Before the modified inode or directory block are allowed to be written back to disk, the corresponding log records must be forced to disk. Thus, if the node fails after writing the directory block but before the inode is written to disk, the node's log is guaranteed to redo the missing inode update. Once the updates described by a log record have been written back to disk, the log record is no longer needed and can be discarded. Logs can be fixed size because space in the log can be freed at any time by flushing dirty metadata back to disk in the background.

After log recovery completes, other nodes can acquire any metanode tokens that had been held by the failed node and thus take over the role of metanode. If another node had sent metadata updates to the old metanode but, at the time of the failure, had not yet received an acknowledgment that the updates were committed to disk, it re-sends the updates to the new metanode. These updates can be re-applied by the new metanode.

Should the token manager fail, another node will take over this responsibility and reconstruct the token manager state by querying all surviving nodes about the tokens they currently hold. Since the new token manager does not know what tokens were held by failed nodes, it will not grant any new tokens until log recovery is complete. Tokens currently held by the surviving nodes are not affected.

Similarly, other special functions carried out by a failed node (e.g., allocation manager) can be assigned to another node which rebuilds the necessary state by reading information from disk and/or querying other nodes.

Node failures can be detected by a group services layer that monitors nodes and communication links via periodic heartbeat messages and implements group membership protocols. When a node fails, the group services layer can inform the remaining nodes of a group membership change. This then triggers any recovery actions needed. When a node fails, the file system manager will fence disk access to prevent data corruption.

Consider the following scenario. A node1 is intending to mount a file system. Node1 sends a Remote Procedure Call (RPC) to the file system manager node asking for the appropriate permission token to mount a file system. The file system manager receives the RPC and sends the appropriate permission token back to node1. Now assume that, before the permission token makes it back to node1, the network fails and node1 is no longer in communication with one or more active nodes in the cluster. The file system manager node realizes that it has lost communication with node1 and blocks (fences) node1 from disk access. But node1 receives the permission token which had been sent before the failure. Having received the appropriate permission, node1 believes it is now okay to unfence itself and begin writing to the disks that make up the file system. Meanwhile, the other nodes in the cluster think that node1 has been completely fenced off from disk access. If other active nodes start writing to this same disks then data corruption will occur.

The present invention solves this problem in a novel way. In a preferred embodiment, the method of the present invention is implemented through a set of SCSI-3 Persistent Reserve commands found in the arts.

In one embodiment, assigning one node in the cluster to act as a cluster manager node with node management responsibilities in the cluster. The cluster manager is in communication with all active nodes in the cluster. The cluster manager is itself an active node. Part of the cluster manager's management responsibilities includes verifying which nodes are active in the cluster and querying the active nodes to establish whether a quorum of active nodes think that the cluster manager is still the manager for the cluster. The invention is best described by way of example.

Figure 2:
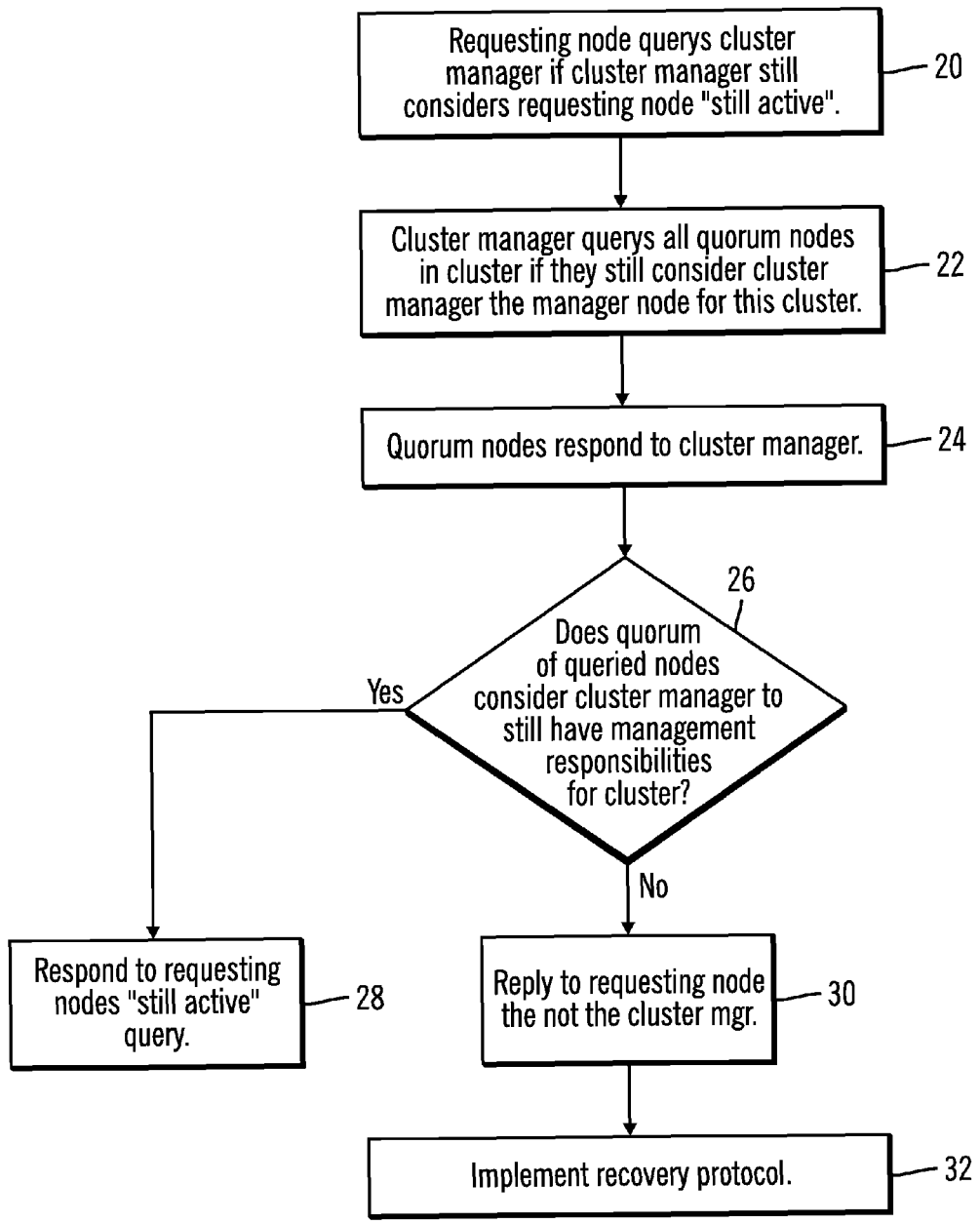
FIG. 2 is a flow diagram illustrating one embodiment of the invention.

Attention is directed to FIG. 2 which illustrates the flow of one embodiment of the invention.

Assume node1 wishes to mount a file system. Node1 sends a Remote Procedure Call (RPC) to cluster manager requesting the appropriate permission token to mount a file system. The cluster manager sends the appropriate permission token to node1. Once requesting node1 receives the permission token, but before node1 unfences itself and mounts the file system, node1 sends an RPC, at 20, to the cluster manager requesting verification that the cluster manager node considers node1 an active node. In the interim, node1 does nothing until it receives the appropriate response from the cluster manager. After node1 receives the appropriate response, it proceeds to unfence itself and mount the file system. If node1 has lost communication with the cluster manager, the cluster manager doesn't receive the RPC requesting active status verification and therefore does not respond appropriately. Although the underlying communication mechanisms may alternatively indicate to the client node that the RPC could not be sent.

Before the cluster manager node responds to node1's active status verification request, in accordance herewith, the cluster manager, at 22, queries the quorum nodes with its own RPC requesting verification whether the quorum nodes believe that the cluster manager still has management responsibilities for that file system. The cluster manager node does not respond to the requesting node1's RPC until it has received responses from a majority of quorum nodes in the cluster. At 24, the quorum nodes respond to the cluster manager's query. At 26, if, based on the responses received, a majority of quorum nodes in the cluster respond that the cluster manager is indeed still the manager for that file system then, at 28, the cluster manager replies to node1's active status verification RPC that node1 is still considered active.

If, on the other hand, the cluster manager hears back from a subset of quorum nodes in the cluster, then the cluster manager assumes there has been some catastrophic failure. At 30, the cluster manager responds to the requesting node that it is no longer the cluster manager. At which point, the requesting node has to learn who is the new cluster manager and initiate a new request. Mechanisms for the election of a new cluster manager and the communication of that new information to active nodes in the cluster are found in the arts. At 32, the cluster manager implements a recovery protocol. The recovery protocol will depend on the nature of the failure. In one embodiment, the cluster manager node awaits further instructions. In another embodiment, it awaits a user intervention.

If, on the other hand, the cluster manager did not receive replies from any nodes in the cluster then the cluster manager node assumes that it must have been negatively impacted by a communication failure because it is no longer in communication with the rest of the active nodes within the cluster. The cluster manager node preferably has queued RPC requests. In this case, the cluster manager node does not respond to any RPCs it has queued. Note that the present technique also advantageously handles the case wherein the cluster manager node wants to write to disk and considers itself still active but has lost communication with the rest of the rest of the cluster. In one embodiment, the cluster manager downgrades its own status as cluster manager and implements a node failure protocol. In another embodiment, the cluster manager waits to hear from a system recovery process or alternatively a user intervention.

In yet another embodiment, since the active nodes have lost communication with their cluster manager node, the active nodes implement a protocol wherein they agree to elect (upgrade) another active node in the cluster to act as the new cluster manager. In this instance, the file system continues to function normally while a recovery process tries to determine what happened to the cluster manager and repair the node or otherwise bring it back online. In an alternative embodiment, the active nodes restore cluster management responsibilities to the cluster manager node after it comes back online. In another embodiment, the active nodes wait for a user intervention.

The novel approach of the present invention ensures file system integrity during a file mount without adversely impacting system overhead.

It should be understood that one skilled in this art would readily be able to implement in their own particular file system configuration, the techniques disclosed herein utilizing, in a preferred embodiment, the SCSI-3 Persistent Reserve commands without undue experimentation.

The foregoing description of the exemplary embodiment of the invention has been presented for the purposes of illustration and description. It is not intended to be exhaustive or to limit the invention to the precise form disclosed. Many modifications and variations are possible in light of the above teaching. Other software and hardware implementations fall within the scope of the present invention as claimed.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for preventing a requesting node from unfencing and mounting a file system subsequent to a failure in a cluster file system having a plurality of active nodes, comprising:

upgrading one active node in said cluster to a cluster manager node;

receiving, by a requesting node, permission from a file system manager to mount said file system;

issuing from said requesting node an active status request to said cluster manager node in response to said requesting node receiving permission to mount said file system from said file system manager;

defining a majority of active nodes as quorum nodes in said cluster;

placing said cluster manager in communication with active nodes in said cluster;

assigning to said cluster manager responsibilities, in part, comprising:

receiving the active status request from said requesting node in said cluster in response to said requesting node;

querying, in response to receiving said active status request, said quorum nodes whether each node considers said cluster manager to still have cluster management responsibilities for said file system;

determining, in response to said querying, whether a majority of quorum nodes have responded to said querying; and in response to a majority of said quorum nodes considering said cluster manager to still have cluster management responsibilities for said file system then said cluster manager sending a response to said requesting node's active status request; and mounting said file system by said requesting node only in response to receiving said response from said cluster manager.

2. A method as in claim 1, said cluster node in communication with other nodes in said cluster, at least in part, utilizing a subset of SCSI-3 Persistent Reserve commands.

3. A method as in claim 1, said requesting node first requesting a token from said cluster manager granting permission to mount said file system.

4. A method as in claim 1, said cluster manager node further accessing a list of active nodes in said cluster.

5. A method as in claim 1, said majority of quorum nodes being determined dynamically after a node failure has been detected.

6. A method as in claim 1, said cluster manager queuing active status requests during said querying of said quorum nodes.

7. A method as in claim 1, in response to a majority of said quorum nodes not considering said cluster manager to still have cluster management responsibilities for said file system then said cluster manager responding to said requesting node that said cluster manager no longer has management responsibilities for said file system.

8. A machine readable storage medium containing an instruction set for preventing a requesting node from unfencing and mounting a file system subsequent to a failure in a cluster file system having a plurality of active nodes, said instruction set comprising:
   upgrading one active node in said cluster to a cluster manager node;
      receiving, by a requesting node, permission from a file system manager to mount said file system;
      issuing from said requesting node an active status request to said cluster manager node in response to said requesting node receiving permission to mount said file system from said file system manager;
   defining a majority of active nodes as quorum nodes in said cluster;
   placing said cluster manager in communication with active nodes in said cluster;
   assigning to said cluster manager responsibilities, in part, comprising:
      receiving the active status request from said requesting node in said cluster in response to said requesting node;
      querying, in response to receiving said active status request, said quorum nodes whether each node considers said cluster manager to still have cluster management responsibilities for said file system;
      determining, in response to said querying, whether a majority of quorum nodes have responded to said querying; and
      in response to a majority of said quorum nodes considering said cluster manager to still have cluster management responsibilities for said file system then said cluster manager sending a response to said requesting node's active status request; and
   mounting said file system by said requesting node only in response to receiving said response from said cluster manager.

9. A machine readable storage medium as in claim 8, wherein said requesting node does not mount a file system until it has received said response to said active status request.

10. A machine readable storage medium as in claim 8, said cluster node in communication with other nodes in said cluster, at least in part, utilizing a subset of SCSI-3 Persistent Reserve commands.

11. A machine readable storage medium as in claim 8, said requesting node first requesting a token from said cluster manager granting permission to mount said file system.

12. A machine readable storage medium as in claim 8, said majority of quorum nodes being determined dynamically after a node failure has been detected.

13. A machine readable storage medium as in claim 8, in response to a majority of said quorum nodes not considering said cluster manager to still have cluster management responsibilities for said file system then said cluster manager responding to said requesting node that said cluster manager no longer has management responsibilities for said file system.

14. A cluster file system of computer nodes which prevents a requesting node from unfencing and mounting a file system on said cluster file system subsequent to a failure, said system comprising:
   a plurality of active nodes wherein a majority of active nodes are quorum nodes;
   at least one cluster manager node in communication with said plurality of active nodes;
   a file system manager;
   a requesting node receiving permission from said file system manager to mount said file system;
   said requesting node issuing an active status request to said cluster manager node in response to said requesting node receiving permission to mount said file system from said file system manager;
   said at least one cluster manager node being assigned responsibilities, in part, comprising:
      receiving the active status request from said requesting node in said cluster in response to said requesting node;
      querying, in response to receiving said active status request, said quorum nodes whether each node considers said cluster manager to still have cluster management responsibilities for said file system;
      determining, in response to said querying, whether a majority of quorum nodes have responded to said querying; and
      in response to a majority of said quorum nodes considering said cluster manager to still have cluster management responsibilities for said file system then said cluster manager sending a response to said requesting node's active status request; and
   wherein the requesting node mounts said file system only in response to receiving said response from said cluster.

15. A cluster file system as in claim 14, wherein said requesting node does not mount a file system until it has received said response to said active status request.

16. A cluster file system as in claim 14, said cluster node in communication with other nodes in said cluster, at least in part, utilizing a subset of SCSI-3 Persistent Reserve commands.

17. A cluster file system as in claim 15, said requesting node first requesting a token from said cluster manager granting permission to mount said file system.

18. A cluster file system as in claim 15, said majority of quorum nodes being determined dynamically after a node failure has been detected.

19. A cluster file system as in claim 15, in response to a majority of said quorum nodes not considering said cluster manager to still have cluster management responsibilities for said file system then said cluster manager responding to said requesting node that said cluster manager no longer has management responsibilities for said file system.

* * * * *